(12) United States Patent
Broerman et al.

(10) Patent No.: US 10,681,615 B2
(45) Date of Patent: Jun. 9, 2020

(54) PREDICTIVE RATE LIMITING FOR RELIABLE BLUETOOTH LOW ENERGY CONNECTIONS

(71) Applicant: Schlage Lock Company LLC, Carmel, IN (US)

(72) Inventors: Keith R. Broerman, Loveland, OH (US); Andrew Setter, Carmel, IN (US)

(73) Assignee: Schlage Lock Company LLC, Carmel, IN (US)

(*) Notice: Subject to any disclaimer, the term of this patent is extended or adjusted under 35 U.S.C. 154(b) by 43 days.

(21) Appl. No.: 16/017,139

(22) Filed: Jun. 25, 2018

(65) Prior Publication Data

US 2019/0028958 A1    Jan. 24, 2019

Related U.S. Application Data

(60) Provisional application No. 62/524,460, filed on Jun. 23, 2017.

(51) Int. Cl.
*H04W 48/06* (2009.01)
*H04W 76/14* (2018.01)
(Continued)

(52) U.S. Cl.
CPC ......... *H04W 48/06* (2013.01); *H04L 63/0807* (2013.01); *H04W 4/80* (2018.02);
(Continued)

(58) Field of Classification Search
CPC ....... H04W 4/80; H04W 48/06; H04W 76/14; H04L 63/0807
See application file for complete search history.

(56) References Cited

U.S. PATENT DOCUMENTS

| 2010/0229218 A1* | 9/2010 | Kumbalimutt | ........ G06F 9/5005 726/4 |
| 2015/0033286 A1* | 1/2015 | Shahidzadeh | ........ H04L 63/10 726/1 |

(Continued)

OTHER PUBLICATIONS

Gomez et al., Overview and Evaluation of Bluetooth Low Energy: An Emerging Low-Power Wireless Technology, Sensors, Aug. 29, 2012, pp. 11734-11753, MDPI, Basel, Switzerland.

*Primary Examiner* — Rhonda L Murphy
(74) *Attorney, Agent, or Firm* — Taft Stettinius & Hollister LLP

(57) ABSTRACT

A method according to one embodiment includes determining, by a host processor of a master device, a combined cost of an outgoing message transmission of the master device and an expected response message from a slave device; determining, by the host processor, a number of available tokens associated with data transmission; reducing, by the host processor, the number of available tokens by the combined cost in response to a determination that the combined cost does not exceed the number of available tokens; periodically increasing the number of available tokens up to a token maximum by a predefined number of tokens based on a token refill rate; and sending the outgoing message from the host processor to Bluetooth Low Energy communication circuitry of the master device in response to the determination that the combined cost does not exceed the number of available tokens.

20 Claims, 12 Drawing Sheets

(51) Int. Cl.
*H04L 29/06* (2006.01)
*H04W 4/80* (2018.01)
*H04W 24/02* (2009.01)
*H04W 88/16* (2009.01)
*H04W 84/18* (2009.01)
*H04W 12/08* (2009.01)

(52) U.S. Cl.
CPC ........... *H04W 24/02* (2013.01); *H04W 76/14* (2018.02); *H04W 12/08* (2013.01); *H04W 84/18* (2013.01); *H04W 88/16* (2013.01)

(56) References Cited

U.S. PATENT DOCUMENTS

2016/0328796 A1* 11/2016 Acuna-Rohter ..... G06Q 10/107
2017/0192722 A1*  7/2017 Erez .......................... G06F 1/26

* cited by examiner

| Application Message Type | Application Operating Mode | | Comment |
|---|---|---|---|
| | RSI Mode | IP Mode | |
| | Message Cost | | |
| RTAC | 120*2 | 160*2 | RTAC's have a 2x scale factor for the high overhead cost of back-and-forth message reply return traffic |
| JDT Normal Message | 23 + size | 23 + size | |
| JDT Fragment Header | 20 | 20 | |
| JDT Resume Header | 20 | 20 | |
| Link | 1 | 1364 | RSI Mode link timing is determined by external device. Unable to predict accurate cost. |
| Reconnect | 1160 | 1160 | |
| Time Get | 40 | 40 | |
| Time Set | 40 | 40 | |
| Config Get | 1000 | 1000 | |

FIG. 7

PREDICTIVE RATE LIMITING FOR RELIABLE BLUETOOTH LOW ENERGY CONNECTIONS

CROSS-REFERENCE TO RELATED APPLICATIONS

This application claims the benefit of U.S. Provisional Application No. 62/524,460 filed on Jun. 23, 2017, the contents of which are incorporated herein by reference in their entirety.

BACKGROUND

Bluetooth Low Energy (Bluetooth LE, BLE, Bluetooth Smart) is a wireless personal area network technology developed for short-range control and monitoring applications, for example, in the healthcare, fitness, beacons, security, and home entertainment industries. BLE is capable of providing considerably reduced power consumption and cost while maintaining a similar communication range compared to classic or traditional Bluetooth communication.

The Bluetooth Core 4.0 specification defines the physical and logical layer requirements for BLE devices. These include the Physical Layer, the Link Layer, the Logical Link Control and Adaptation Protocol (L2CAP), the Security Manager (SM) and Security Manager Protocol (SMP), the Attribute Protocol (ATT), and the Generic Attribute Profile (GAP). The Bluetooth Core 4.0 specification also describes, for example, the behaviors and methods for device discovery, connection establishment, security, authentication, association models, and service discovery.

At the physical layer, BLE employs two multiple access schemes: frequency division multiple access (FDMA) and time division multiple access (TDMA). Forty radio frequency (RF) channels in the physical layer and having a channel spacing of 2 MHz are used in the FDMA scheme. In the time domain, a TDMA-based polling scheme is used in which the master (central) device transmits a packet at a predetermined time and the corresponding slave (peripheral) device responds with a packet after a fixed interval.

In order for bidirectional data communication between two BLE devices to occur, the devices must connect to each other. At the link layer, an asymmetric procedure is employed for the creation of such a connection. In particular, an advertiser device announces through the advertising channels that it is a connectable device, and the other device (i.e., the initiator device) listens for those advertisements. When an initiator finds an advertiser, it may transmit a Connection Request message to the advertiser, which creates a point-to-point connection between the two devices. Both devices can then communicate by using the physical data channels.

BLE defines two device roles at the link layer for a created connection: the master and the slave. These are the devices that act as initiator and advertiser during the connection creation, respectively. As called out by Bluetooth Core Specification v4.1, a master can manage multiple simultaneous connections with different slaves, whereas each slave can only be connected to one master. Thus, the network composed by a master and its slaves follows a star topology and is frequently referred to as a "piconet."

In order to save energy, slave devices are in sleep mode by default and wake up periodically to listen for possible packet receptions from the master. The master device determines the instances in which slaves are required to listen, and thus coordinates the medium access by using a Time Division Multiple Access (TDMA) scheme. The master device also provides the corresponding slave device with the information needed for the frequency hopping algorithm (including the map of data channels to be used) and for the connection supervision. The parameters related with the management of a connection are transmitted in the Connection Request message and can be updated during the connection for various reasons.

Once a connection between a master device and a slave device is created, the physical channel is divided into non-overlapping time units called connection events. Every connection event starts with the transmission of a packet by the master device. If the slave device receives a packet, the slave device must send a packet to the master device in response. At least one Inter Frame Space (IFS) of 150 µs must pass between the end of the transmission of a packet and the start of the next one. While the master and slave continue to alternate in sending packets, the connection event is considered to be open. Data channel packets include a More Data (MD) bit which signals whether the sender has more information to transmit. If none of the devices has more data to transmit, the connection event will be closed and the slave will not be required to listen until the beginning of the next connection event. Other circumstances can force the end of a connection event, such as the reception of two consecutive packets with bit errors by either the master or the slave.

The time between the start of two consecutive connection events is specified by the Connection Interval parameter, which is a multiple of 1.25 ms in the range between 7.5 ms and 4 s. Another important parameter is the Connection Slave Latency, which defines the number of consecutive connection events during which the slave is not required to listen to the master and thus can keep the radio turned off. This parameter is an integer chosen between 0 and 499 and should not cause a supervision timeout. A supervision timeout happens when the time since the last received packet exceeds the Connection Supervision Timeout parameter, which is in the range between 100 ms and 32 s. The purpose of this mechanism is to detect the loss of a connection due to severe interference or the movement of a device outside the range of its peer.

The Attribute Protocol (ATT) layer defines the communication between two devices playing the roles of server and client, respectively, on top of a dedicated L2CAP channel. The server maintains a set of attributes. An attribute is a data structure that stores the information managed by the GATT, the protocol that operates on top of the ATT. The client or server role is determined by the GATT, and is independent of the slave or master role.

The client can access the server's attributes by sending requests, which trigger response messages from the server. For greater efficiency, a server can also send two types of unsolicited messages, which contain attributes, to a client: (i) notifications, which are unconfirmed; and (ii) indications, which require the client to send a confirmation. A client may also send commands to the server in order to write attribute values. Request/response and indication/confirmation transactions follow a stop-and-wait scheme.

Although BLE communications are generally reliable with one or two simultaneous slave connections, long-term reliability with a large number (e.g., ten or more) of simultaneous and active slave connections is a significant challenge. Ten active connections involves the master radio fairly scheduling ten connection event anchor points per connection interval and to limit each connection event within the interval so that all connections are serviced fairly.

However, the Bluetooth Core specification does not address radio scheduling requirements, instead leaving the implementation up to each silicon vendor. As such, the typical result is increasingly unreliable operation as the number of active simultaneous connections increase to the maximum limit of the radio hardware and firmware.

SUMMARY

According to one embodiment, a method according to one embodiment may include determining, by a host processor of a master device, a combined cost of an outgoing message transmission of the master device and an expected response message from a slave device; determining, by the host processor, a number of available tokens associated with data transmission; reducing, by the host processor, the number of available tokens by the combined cost in response to a determination that the combined cost does not exceed the number of available tokens; periodically increasing the number of available tokens up to a token maximum by a predefined number of tokens based on a token refill rate; and sending the outgoing message from the host processor to Bluetooth Low Energy communication circuitry of the master device in response to the determination that the combined cost does not exceed the number of available tokens.

In some embodiments, the token refill rate may be based on an average transfer rate of the Bluetooth Low Energy communication circuitry. In some embodiments, the token maximum may be associated with a burst rate of the Bluetooth Low Energy communication circuitry and based on a buffer size of the Bluetooth Low Energy communication circuitry. In some embodiments, sending the outgoing message from the host processor to the Bluetooth Low Energy communication circuitry may include sending the outgoing message through a host controller interface of the master device. In some embodiments, the master device is a gateway device. In some embodiments, the slave device is an access control device. In some embodiments, the access control device is an electronic lock.

According to another embodiment, a gateway may include a Bluetooth Low Energy communication circuitry, a processor, and a memory comprising a plurality of instructions stored thereon that, in response to execution by the processor, causes the processor to determine a combined cost of an outgoing message transmission and an expected response message from an access control device, determine a number of available tokens associated with data transmission, reduce the number of available tokens by the combined cost in response to a determination that the combined cost does not exceed the number of available tokens, and send the outgoing message from the host processor to the Bluetooth Low Energy communication circuitry in response to the determination that the combined cost does not exceed the number of available tokens.

In some embodiments, the plurality of instructions may further cause the processor to periodically increase the number of available tokens up to a token maximum by a predefined number of tokens based on a token refill rate. In some embodiments, the Bluetooth Low Energy communication circuity may include a Bluetooth Low Energy controller. In some embodiments, the Bluetooth Low Energy communication circuitry may include a Bluetooth Low Energy radio. In some embodiments, the Bluetooth Low Energy communication circuitry may include a system-on-a-chip that includes the Bluetooth Low Energy controller and the Bluetooth Low Energy radio According to yet another embodiment, a system may include a plurality of access control devices, and a gateway device simultaneously communicatively coupled to the plurality of access control devices over corresponding Bluetooth Low Energy connections, the gateway device configured to (i) determine, by a host processor of the gateway device, a combined cost of an outgoing message transmission of the gateway device and an expected response message from a target access control device of the plurality of access control devices, (ii) determine, by the host processor, a number of available tokens associated with data transmission, (iii) reduce, by the host processor, the number of available tokens by the combined cost in response to a determination that the combined cost does not exceed the number of available tokens, and (iv) send the outgoing message from the host processor to Bluetooth Low Energy communication circuitry of the gateway device in response to the determination that the combined cost does not exceed the number of available tokens.

In some embodiments, the gateway device may be further configured to periodically increase the number of available tokens up to a token maximum by a predefined number of tokens based on a token refill rate. In some embodiments, the token maximum may be based on a buffer size of a controller of the Bluetooth Low Energy communication circuitry. In some embodiments, the token refill rate may be based on an average transfer rate of the Bluetooth Low Energy communication circuitry. In some embodiments, the gateway device may be configured to send the outgoing message from the host processor to the Bluetooth Low Energy communication circuitry through a host controller interface of the gateway device. In some embodiments, the Bluetooth Low Energy communication circuitry may be a system-on-a-chip that includes a Bluetooth Low Energy controller and a Bluetooth Low Energy radio. In some embodiments, the gateway device may be configured to determine the combined cost based on a cost database. In some embodiments, at least one access control device of the plurality of access control devices is an electronic lock.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIG. 7 is a simplified diagram of at least one embodiment of a cost database;

DETAILED DESCRIPTION

Figure 1:
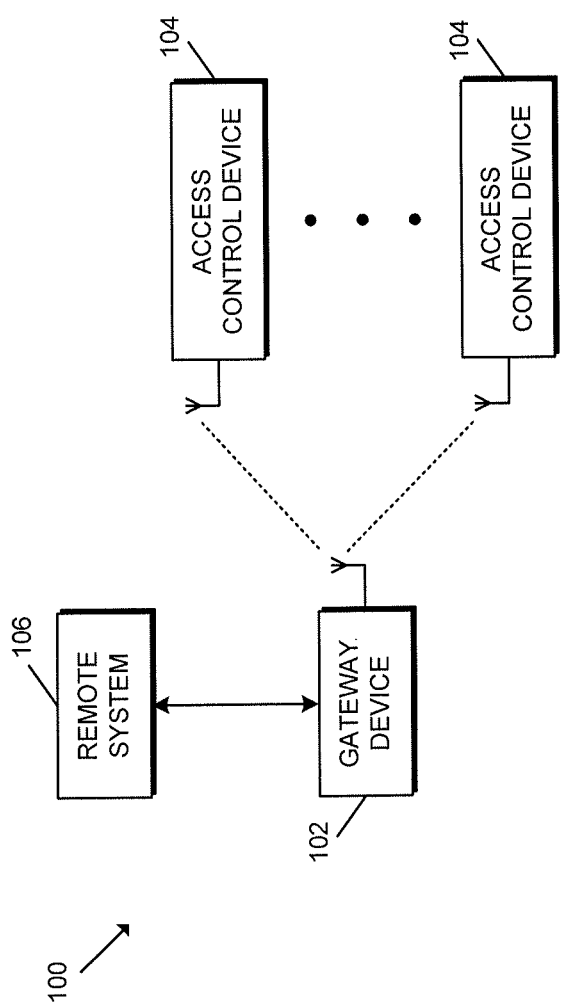
FIG. 1 is a simplified block diagram of at least one embodiment of a system for predictive rate limiting for reliable BLE connections.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

It should be appreciated that BLE communication connections are generally short-lived and the number of concurrent connections are typically few. As such, when a master/central device establishes many simultaneous BLE connections with slave/peripheral devices, the BLE communication often suffers from a lack of reliability. For example, some BLE radio vendor-specific implementations exhibit oversubscription of the connection interval. For a given BLE connection, if the master or slave has a large amount of data to send, it will send multiple packets via the More Data (MD) bit during its connection event. If the radio scheduling algorithm permits the connection event to encroach into the next connection's time slot, however, then both connections experience interference, packet loss, and the connection can be dropped.

Additionally, some BLE radio vendor-specific implementations exhibit a non-equal spacing of the connection event start time (anchor point) within a connection interval. Non-equal anchor point spacing, coupled with usage of the More Data (MD) bit, can result in some connections receiving more "air time" than others. As a result, connections with smaller time allocations are typically starved for air time, and therefore experience a lower data transmission rate than the other connections. Although the Bluetooth Core specification is based on TDMA, it does not specify that the master must equally subdivide the Connection Interval among each connection or that the master must limit the number of packets sent within a connection event to avoid encroaching into or overrunning another connection.

Further, when BLE radio host controller interface (HCI) hardware flow control is not available or not used, data overrun can occur when the host sends bursts of outgoing packets to the BLE radio. BLE radios have limited buffer memory used to queue outgoing packets and, once the queue is full, the remaining packets are dropped before they can be transmitted. Even when BLE radio HCI hardware flow control is available and enabled, some bytes to be transmitted may still be lost, overwritten, or received incorrectly by the radio.

It should be appreciated that the techniques described herein reduce BLE interference, packet loss, and the disconnect rate due, for example, to oversubscription of the connection interval and/or non-equal spacing of the connecting even start time within a connection interval. Further, the techniques described herein also eliminate or reduce the HCI data overrun described above.

Referring now to FIG. 1, in the illustrative embodiment, a system 100 for predictive rate limiting for reliable BLE connections includes a gateway device 102 and a plurality of access control devices 104. Additionally, in some embodiments, the system 106 may include a remote system 106. In the illustrative embodiment, the gateway device 102 (operating as the master/central device) may simultaneously maintain reliable long-term, persistent BLE connections with multiple access control devices 104 (operating as slave/peripheral devices) for the transfer of data between the devices 102, 104. As such, the gateway device 102, acting as master, may initiate all BLE communication with the access control devices 104, listen for advertisements from the access control devices 104, and establish persistent BLE connections to the devices 104. Further, in some embodiments, the gateway device 102 may maintain one or more communicative connections with a remote system 106. For example, the gateway device 102 may be communicatively coupled with a third party controller, monitoring device, and/or other suitable device (e.g., via Ethernet, Wi-Fi, RS-485, and/or other suitable connections). In some embodiments, the illustrative access control devices 104 may be configured to control access through corresponding passageways (e.g., via a lock mechanism such as a deadbolt, latch bolt, lever, and/or other mechanism adapted to move between a locked and unlocked state). However, it should be appreciated that the access control devices 104 may be embodied as other types of access control devices 104 in other embodiments.

As described in detail below, the system 100 provides techniques to reduce the BLE disconnect rate of a large number (e.g., ten or more) of simultaneous BLE connections, thereby resulting in more reliable operation and guaranteed (or more confidence in) data throughput. More specifically, the gateway device 102 may predict the response (number and size of packets) of the corresponding access control device 104 based on the request of the gateway device 102, for example, using knowledge of the system 100 and the higher-level events that will take place as a result of the outgoing request. For example, the gateway device 102 may estimate the transmission costs based on system operating modes, message types, and/or other suitable information. As such, requests known to cause a large influx of response packets may be weighted more heavily than a request that generates less response traffic. By doing so, the gateway device 102 may establish BLE data throughput that closely matches the token refill/regeneration rate, R. Further, the token refill rate, R, may be used by the gateway device 102 or, more specifically, the host controller(s) to properly estimate and schedule large file transfers over the BLE connections as described below. The techniques described herein may also permit the token refill rate (and, therefore, the BLE data rate) to be modified over time based on application logic and/or may permit egress rate limiting that prevents BLE radio HCI buffer overrun. As a result, the BLE disconnect rate of gateway device 102 simultaneously connected to multiple (e.g., ten) active access control devices 104 (e.g., electronic locks) may be reduced to match the disconnect rate of the idle system by employing the techniques described herein.

In some embodiments, based on the BLE message sent and the expected response, the gateway device 102 may allocate transmission tokens that account for both the sent and received BLE data. Because the traffic has been regulated prior to delivery to the BLE radio of the gateway device 102, the number of packets marked with the More Data (MD) bit described above is reduced or eliminated. As such, there is a much lower probability that traffic on one connection will interfere with another connection and cause a disconnect on one or both connections. Additionally, it should be appreciated that the techniques described herein provide a BLE radio vendor-agnostic approach to resolving BLE communication issues related to BLE radio non-linear connection event scheduling and HCI interface data overrun.

It should be appreciated that each of the gateway device 102, the access control devices 104, and the remote system 106 may be embodied as one or more computing devices similar to the computing device 200 described below in reference to FIG. 2. For example, in the illustrative embodiment, each of the gateway device 102, the access control devices 104, and the remote system 106 includes a processing device 202 and a memory 206 having stored thereon operating logic 208 for execution by the processing device 202 for operation of the corresponding device.

Figure 2:
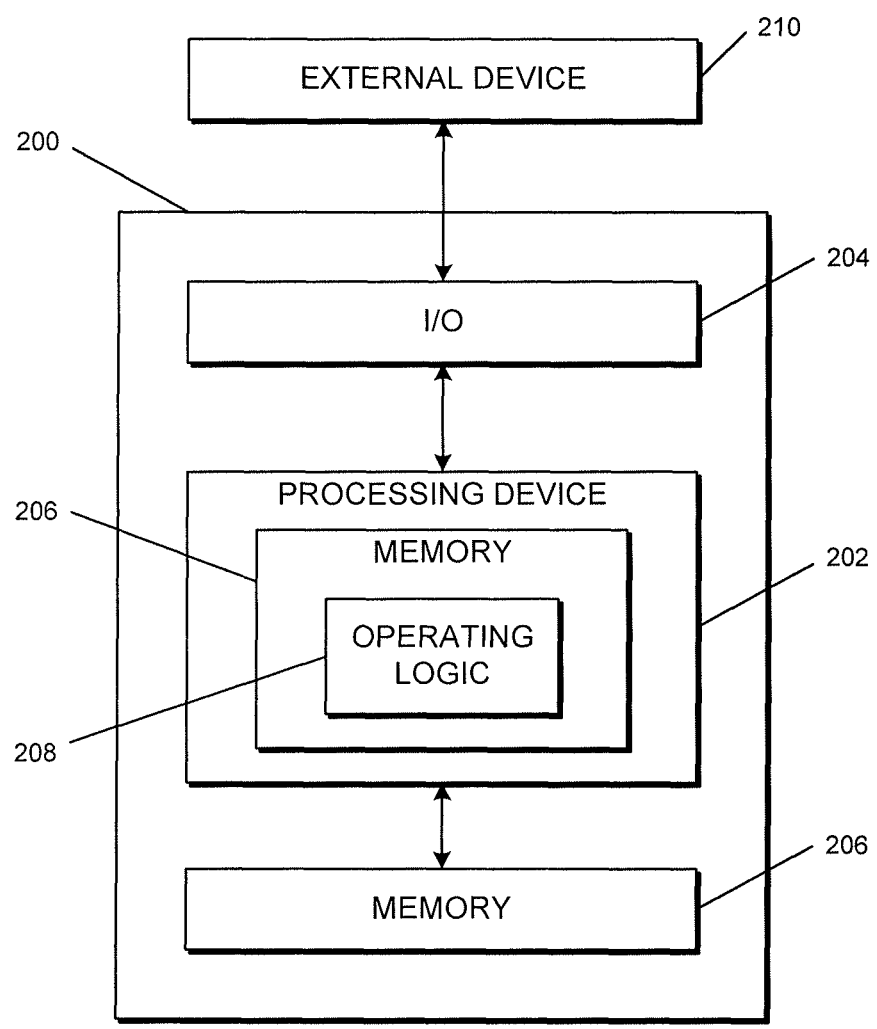
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of a gateway device, an access control device, and/or a remote system that may be utilized in connection with the gateway device 102, the access control devices 104, and/or the remote system 106 illustrated in FIG. 1. Depending on the particular embodiment, computing device 200 may be embodied as a reader device, credential device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the gateway device 102, the access control devices 104, and/or the remote system 106. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
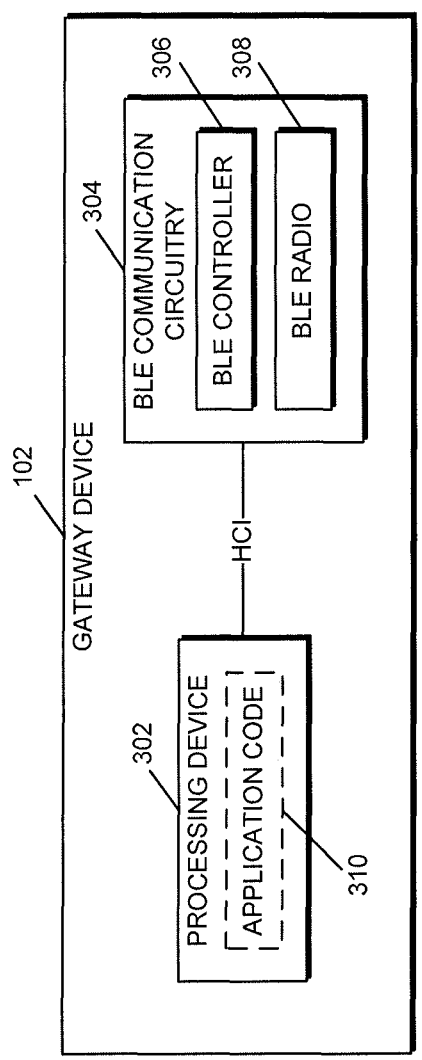
FIG. 3 is a simplified block diagram of at least one embodiment of a gateway device of FIG. 1.

In some embodiments, it should be appreciated that the gateway device 102 may be embodied as the gateway device 102 illustrated in FIG. 3. Referring now to FIG. 3, the illustrative gateway device 102 includes a processing device 302 (e.g., a host processor or host processing device) and a BLE communication circuitry 304. Further, the BLE communication circuitry 304 includes a BLE controller 306 and a BLE radio 308, and the processing device 302 is configured to execute the application code 310. As shown, in the illustrative embodiment, the processing device 302 is configured to communicate with the BLE communication circuitry 304 over a Bluetooth host controller interface (HCI). If the host processor (e.g., the processing device 302) sends information to the controller (e.g., the controller 306) too quickly, the buffer of the controller can be overrun as described above. However, the techniques described herein employ predictive rate limiting that prevents (or reduces) the ability for that to happen.

It should be appreciated that the processing device 302 may be similar to the processing device 202 of FIG. 2 and, therefore, the description of the processing device 302 has been omitted for simplicity of the description. In some embodiments, the processing device 302 executes the application code 310 to establish and maintain communication with third-party controllers and monitoring devices (e.g., the remote system 106), and translates controller commands to lock messages sent over BLE to the access control devices 104 (e.g., electronic locks). In such embodiments, gateway-to-lock BLE communications may also include lock configuration information, status information, audit log information, and/or other suitable information. In some embodiments, the BLE communication circuitry 304 may be implemented as a system-on-a-chip (SoC) that includes the BLE controller 306 and the BLE radio 308.

Depending on the particular embodiment, each of the features of the gateway device 102 described in reference to FIG. 3 may be included in addition to, or in the alternative to, one or more of the features described in reference to FIG. 2.

Figure 4:
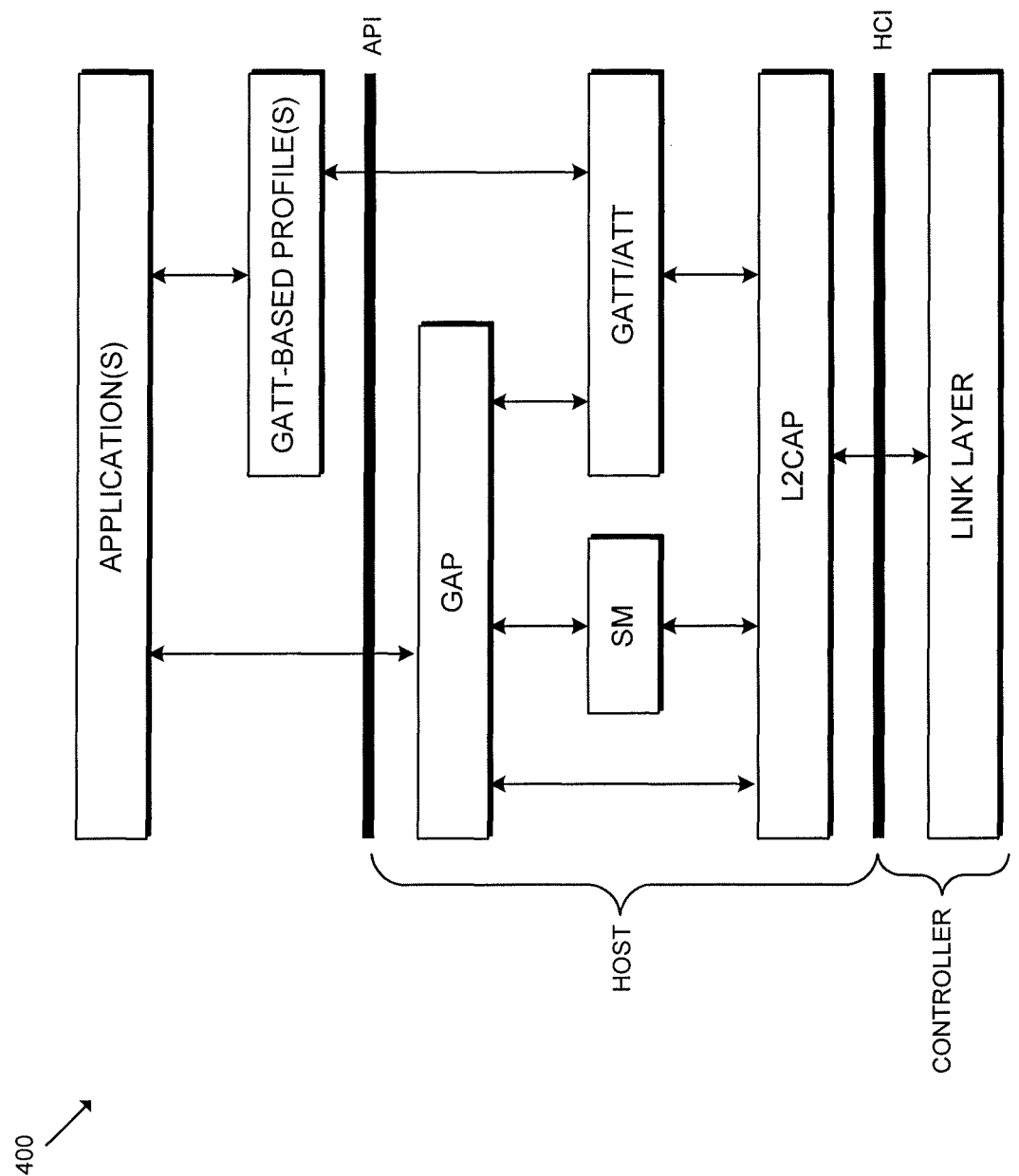
FIG. 4 is a simplified block diagram of at least one embodiment of a BLE protocol stack.

Referring now to FIG. 4, a simplified diagram of a BLE protocol stack 400 is shown. It should be appreciated that the controller (e.g., the controller 306) involves the physical layer and the link layer. Further, the controller handles the functionality of the device and is often combined with a physical radio (e.g., the radio 308). Additionally, in some embodiments, HCI provides a standardized interface between the BLE controller and a microcontroller unit or processing device (e.g., the processing device 302) that is hosting the application (e.g., the application code 310) and the "upper part" of the BLE protocol stack 400.

Figure 5:
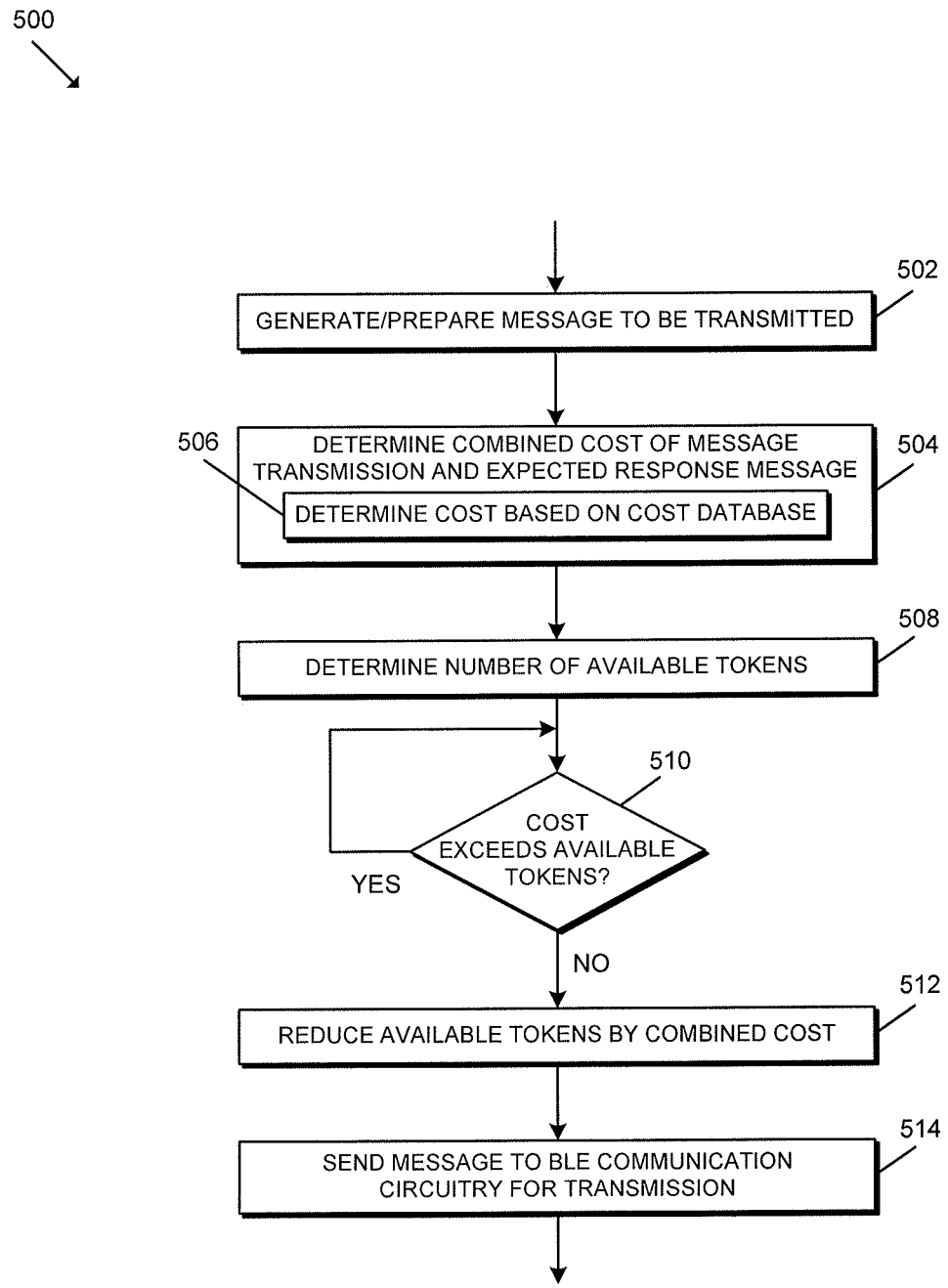
FIG. 5 is a simplified block diagram of at least one embodiment of a method for predictive rate limiting for reliable BLE connections.
Figure 8:
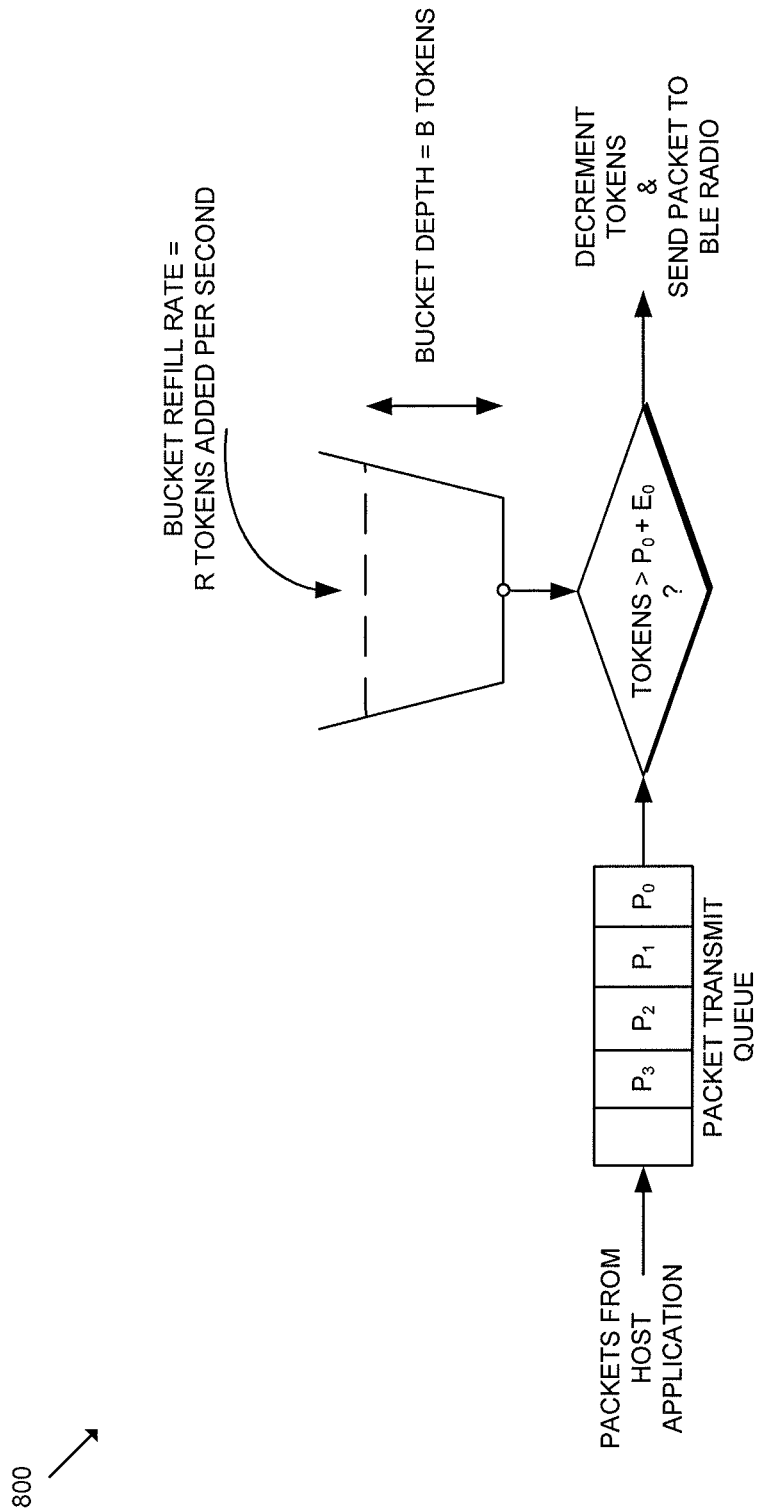
FIG. 8 is a simplified block diagram graphically depicting the methods of FIGS. 6-7.

Referring now to FIG. 5, in use, the gateway device 102 or, more specifically, the processing device 202, 302 of the gateway device 102 may execute a method 500 for predictive rate limiting for reliable BLE connections. It should be appreciated that the particular blocks of the method 500 are illustrated by way of example, and such blocks may be combined or divided, added or removed, and/or reordered in whole or in part depending on the particular embodiment, unless stated to the contrary. The illustrative method 500 begins with block 502 in which the gateway device 102 generates and prepares a message to be transmitted to a particular access control device 104 (i.e., generates/prepares an outgoing message). As shown in reference to FIG. 8, the gateway device 102 may leverage a single token "bucket" to control overall throughput to the BLE radio at the beginning of each message transfer. As such, a single token bucket may be used despite the method 500 being repeated independent for BLE communications associated with each access control device 104.

In block 504 of FIG. 5, the gateway device 102 determines a combined cost of the outgoing message transmission and an expected response message (i.e., the expected return traffic). In doing so, in some embodiments, the gateway device 102 may determine the combined cost of the outgoing message transmission and the expected response message (e.g., the outgoing message cost plus the expected response message cost) based on a cost database in block 506. For example, in some embodiments, the gateway device 102 may store a cost database similar to the cost database 700 of FIG. 7. Depending on the particular embodiment, the cost database may be embodied as any data structure suitable for performing the functions described herein. For example, in some embodiments, the cost database may be embodied as a look-up table or similar data structure that correlates a particular message type with its associated cost. It should be appreciated that the cost database 700 is provided as a partial list of BLE message types and corresponding costs for illustrative purposes only and is not intended to be limited. As such, the particular cost database used by the gateway device 102 may include additional and/or alternative message types and corresponding costs in other embodiments. In the illustrative embodiment, the cost database 700 accounts for different gateway operating modes and message types. In some embodiments, the costs may be based on the known outgoing traffic size and the expected size of the return traffic in bytes.

In block 508, the gateway device 102 determines the number of available tokens (e.g., in the common token bucket). If the gateway device 102 determines, in block 510, that the combined cost exceeds the number of available tokens, the gateway device 102 delays until enough tokens are available to perform the function. As described in reference to the method 600 of FIG. 6, the gateway device 102 periodically increases the number of available tokens up to a token maximum by a predefined number of tokens based on a token refill rate. Returning to block 510 of FIG. 5, if the gateway device 102 determines that the combined cost does not exceed the number of available tokens (and, therefore, there are enough tokens to proceed), the method 500 advances to block 512 in which the gateway device 102 reduces the number of available tokens by the combined cost. In block 514, the gateway device 102 or, more specifically, the processing device 202, 302 sends the outgoing message to the BLE communication circuitry 304 (e.g., via the HCI) for transmission.

Although the blocks 502-514 are described in a relatively serial manner, it should be appreciated that various blocks of the method 500 may be performed in parallel in some embodiments. For example, in some embodiments, the blocks 512, 514 may be performed simultaneously.

Figure 6:
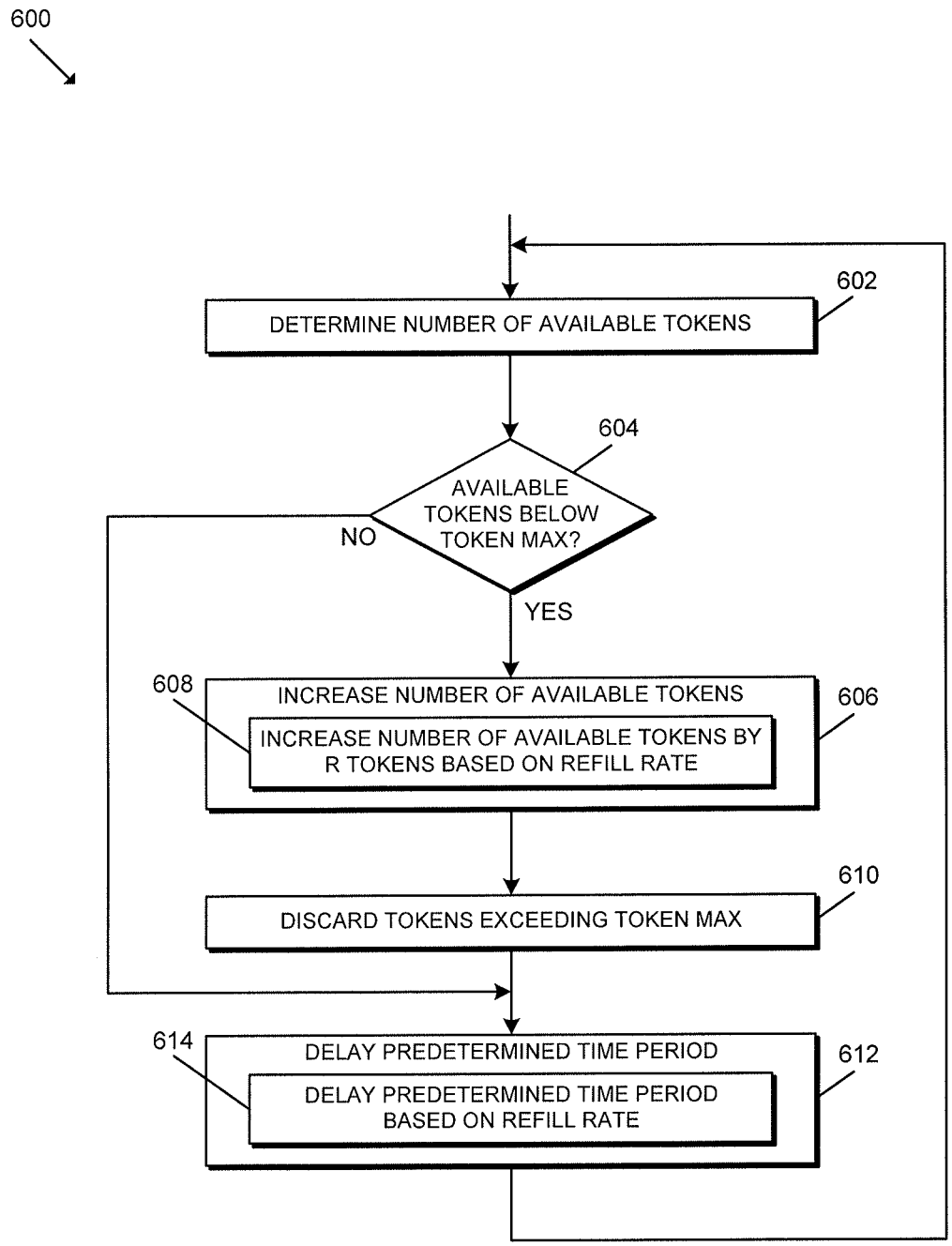
FIG. 6 is a simplified block diagram of at least one embodiment of a method for token regeneration.

Referring now to FIG. 6, in use, the gateway device 102 or, more specifically, the processing device 202, 302 of the gateway device 102 may execute a method 600 for token regeneration. It should be appreciated that the particular blocks of the method 600 are illustrated by way of example, and such blocks may be combined or divided, added or removed, and/or reordered in whole or in part depending on the particular embodiment, unless stated to the contrary. The illustrative method 600 begins with block 602 in which the gateway device 102 determines the number of available tokens (e.g., in the token bucket). If the gateway device 102 determines, in block 604, that the number of available tokens is below a token maximum (e.g., a predefined number), the method 600 advances to block 606 in which the gateway device 102 increases the number of available tokens. In particular, in block 608, the gateway device 102 may increase the number of available tokens by R tokens based on the refill rate (e.g., a predetermined quantity). In block 610, the gateway device 102 discards any tokens exceeding the token maximum. In block 612, the gateway device 102 delays for a predetermined time period. In doing so, in block 614, the gateway device 102 may delay for a predetermined time period that is based on the refill rate. The method 600 returns to block 602 in which the gateway device 102 determines the current number of available tokens.

Returning to block 604, if the gateway device 102 determines that the number of available tokens is not below the token maximum (i.e., the number of tokens is at its maximum), the method 600 advances to block 614 in which the gateway device 102 delays for the predetermined time period. In other words, the execution of the method 600 involves the gateway device 102 periodically refilling the token "bucket" up to a predetermined token maximum and at a predetermined refill rate. In some embodiments, the token refill rate may be based on an average transfer rate of the BLE communication circuitry 304 (e.g., 768 bytes). Further, the token maximum may be associated with a burst rate of the BLE communication circuitry 304 and/or based on a buffer size of the BLE communication circuitry 304. In some embodiments, the burst rate is a function of the radio firmware/hardware (e.g., buffer space) and may be selected based on radio FW and buffer size/rate.

Although the blocks 602-614 are described in a relatively serial manner, it should be appreciated that various blocks of the method 600 may be performed in parallel in some embodiments.

Figure 9:
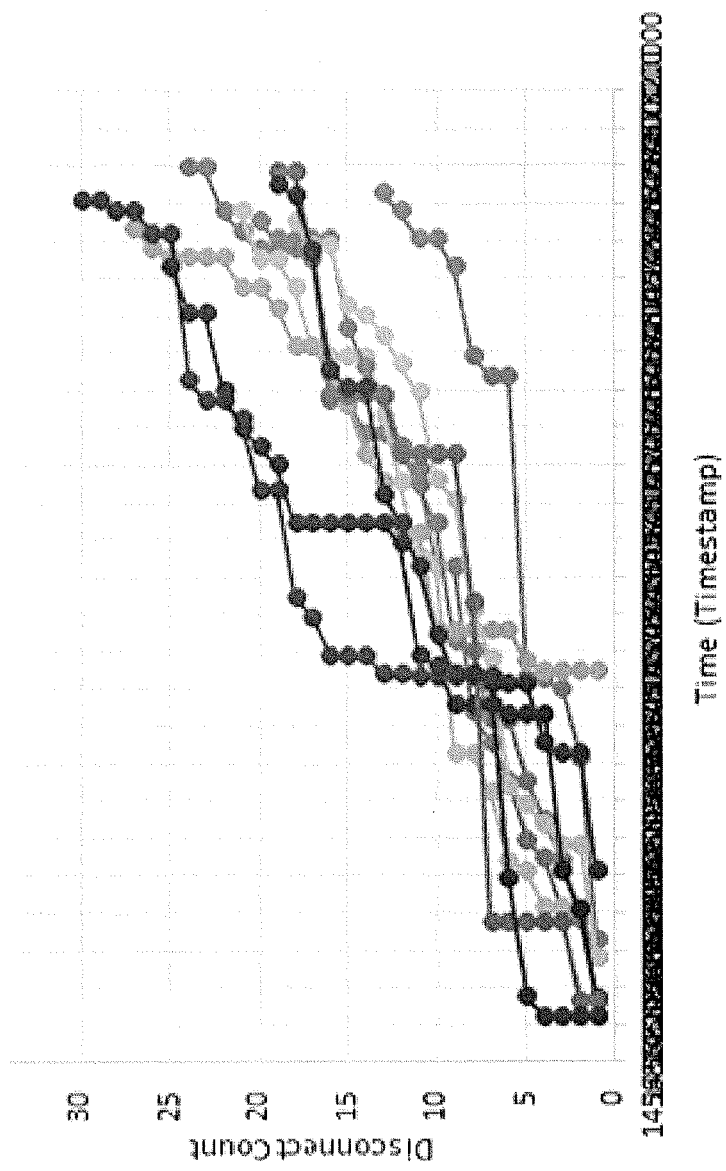
FIGS. 9-12 are graph diagrams that depict a corresponding BLE disconnection rate under various operational conditions.
Figure 10:
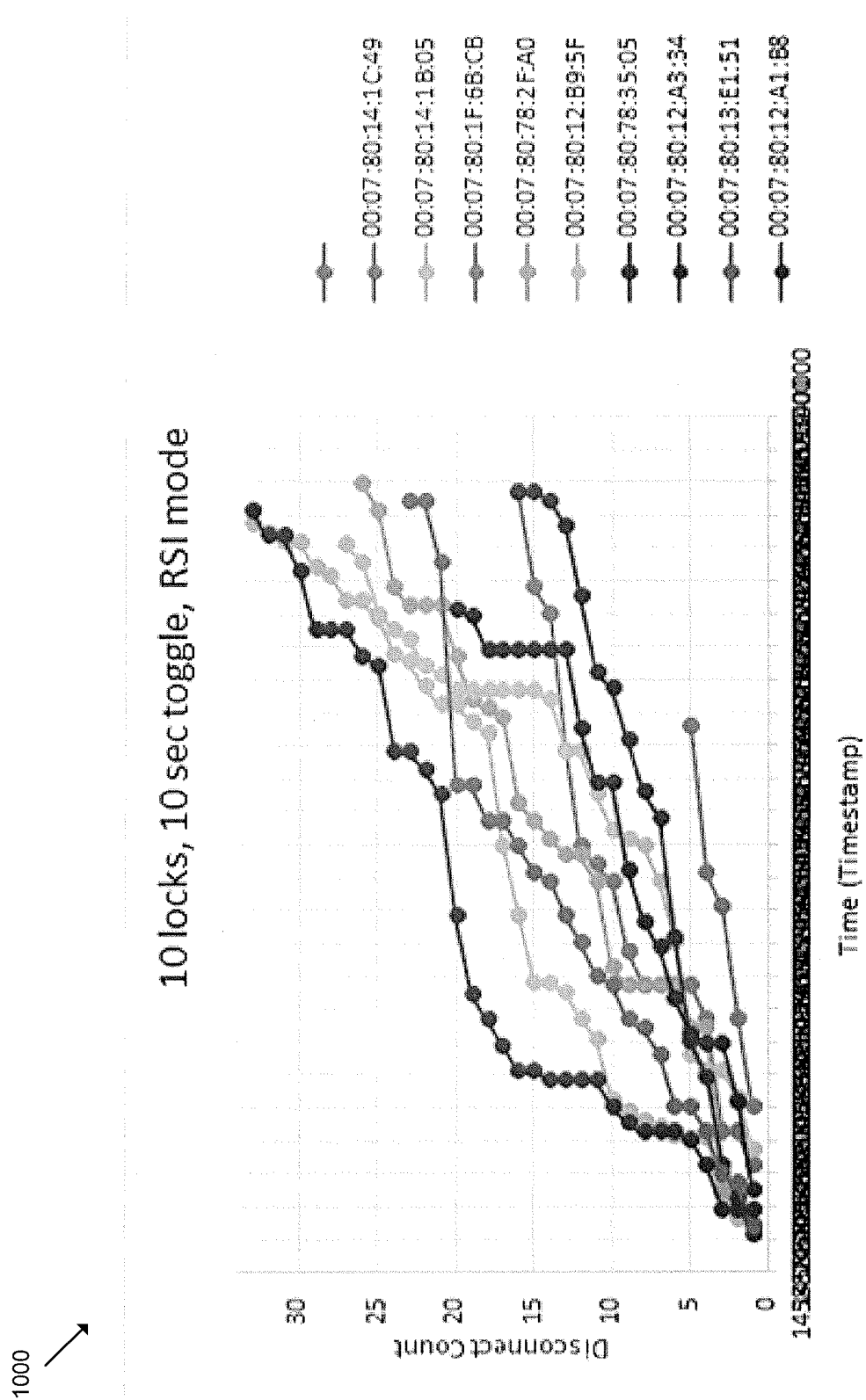
Figure 11:
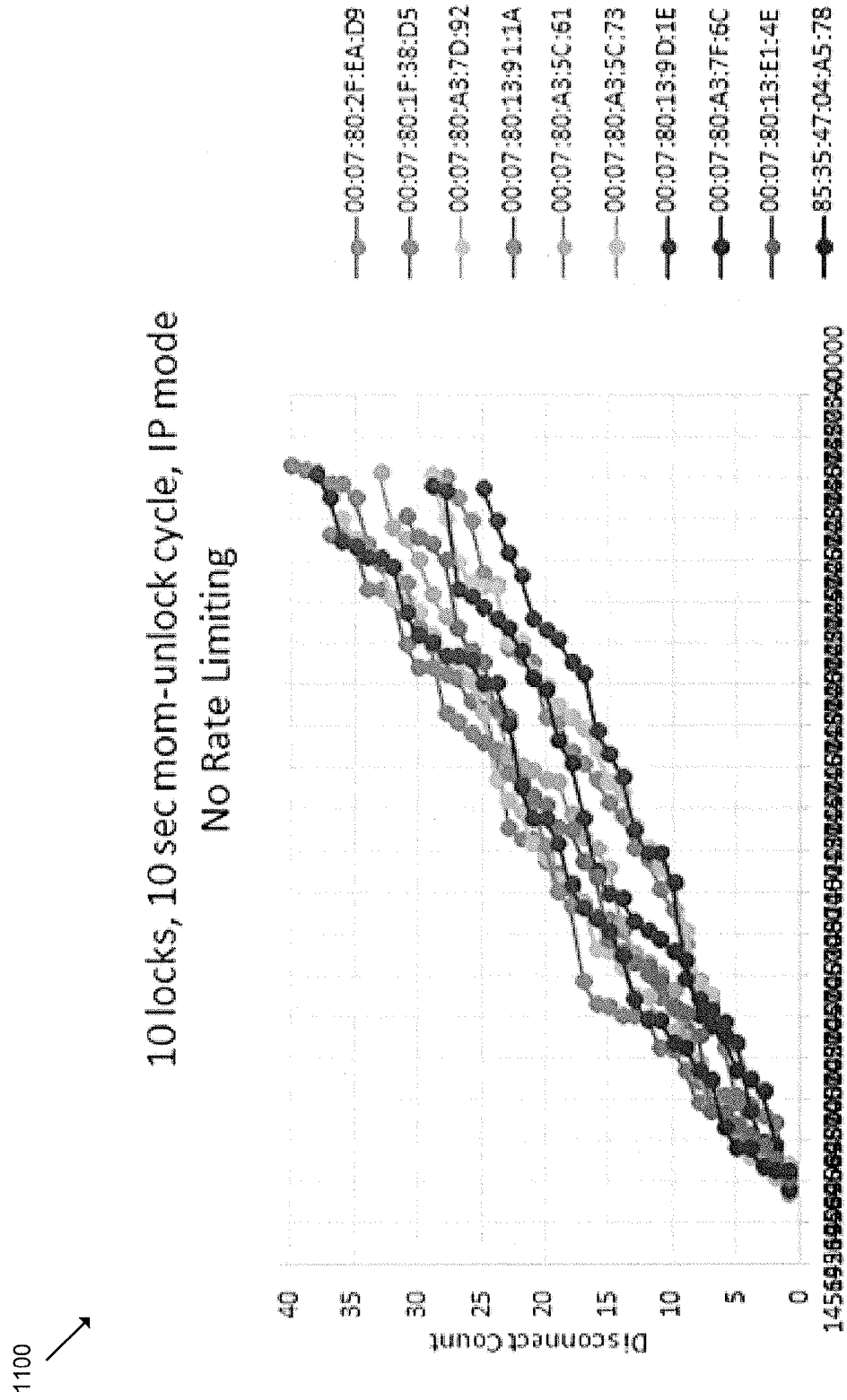
Figure 12:
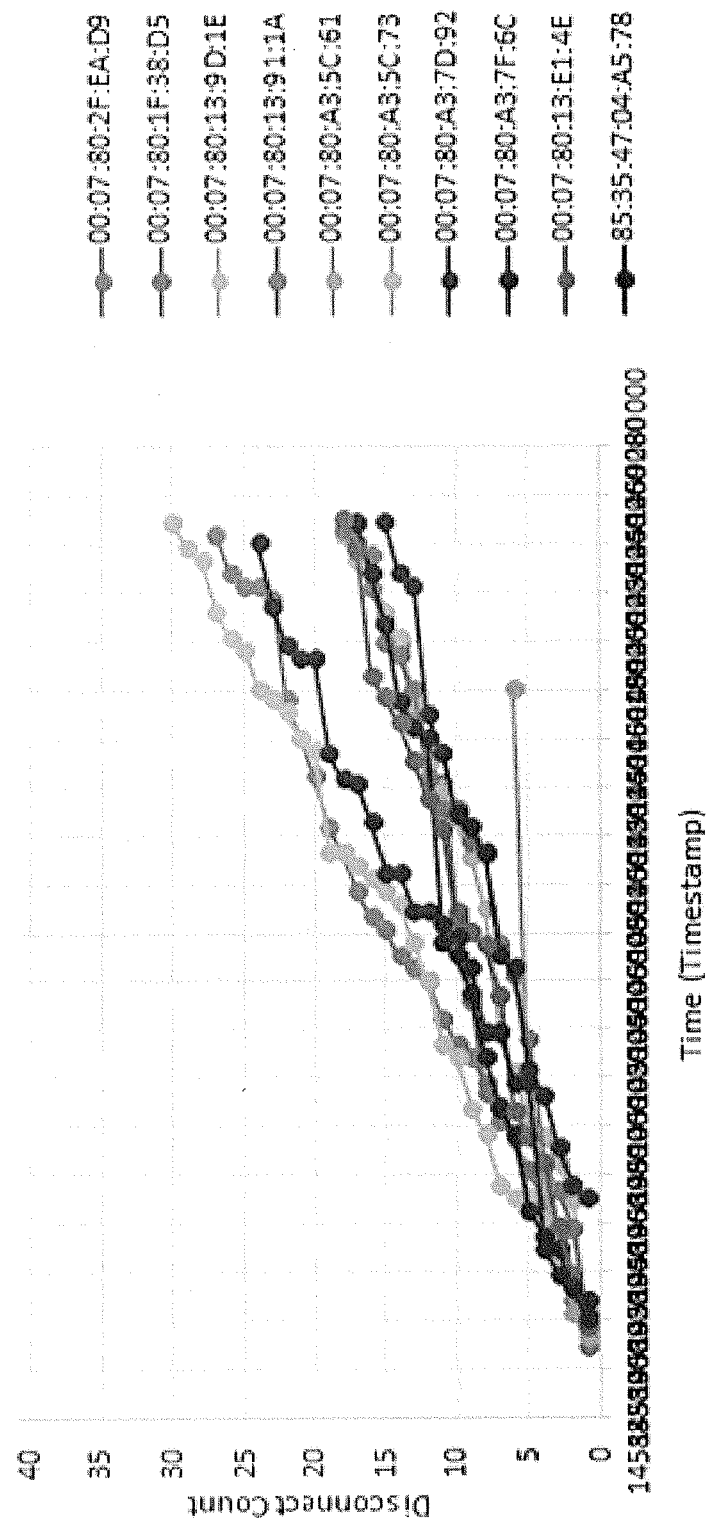

FIGS. 9-12 are graph diagrams 900, 1000, 1100, 1200 that depict corresponding BLE disconnection rates under various operational conditions. In particular, the graph diagrams 900, 1000 of FIGS. 9-10 illustrate that the gateway device 102 employing the techniques described herein may have the same disconnect rate when the system 100 is idle (FIG. 9) as when the system 100 is busy with simultaneous BLE communication with as many as ten access control devices 104 (FIG. 10). Similarly, the graph diagrams 1100, 1200 of FIGS. 11-12 illustrate a significant reduces disconnect count when employing the techniques described herein during simultaneous BLE communication with as many as ten access control devices 104 (FIG. 12) compared to the same amount of BLE communication without employing the techniques described herein (FIG. 11). It should be appreciated that the slope of each line represents the rate of disconnects per time interval, and the height of the final disconnect represents the total number of disconnects experienced during the test window.

In other embodiments, it should be appreciated that the gateway device 102 may utilize multiple predictive rate limiters (e.g., traffic shapers). For example, in some embodiments, the gateway device 102 may use one rate limiter for high priority traffic (e.g., RTAC traffic) and another rate limiter for background bulk data traffic (e.g., JDT traffic). Further, in such embodiments, each rate limiter may have different R and B values described herein such that the low latency high priority traffic is favored. In yet another embodiment, each different type of edge device (e.g., each model of access control device 104) may include its own traffic shaper associated with the various different types of messages that the different edge device type utilizes. In embodiments involving independent traffic shapers, it should be appreciated that the gateway device 102 may further utilize a higher-level supervisory system or controller that coordinates the traffic shapers to avoid the overlap/interference described above.

What is claimed is:

1. A method, comprising:
   determining, by a host processor of a master device, a combined cost of an outgoing message transmission of the master device and an expected response message from a slave device;
   determining, by the host processor, a number of available tokens associated with data transmission;
   reducing, by the host processor, the number of available tokens by the combined cost in response to a determination that the combined cost does not exceed the number of available tokens;
   periodically increasing the number of available tokens up to a token maximum by a predefined number of tokens based on a token refill rate; and
   sending the outgoing message from the host processor to Bluetooth Low Energy communication circuitry of the master device in response to the determination that the combined cost does not exceed the number of available tokens.

2. The method of claim 1, wherein the token refill rate is based on an average transfer rate of the Bluetooth Low Energy communication circuitry.

3. The method of claim 1, wherein the token maximum is associated with a burst rate of the Bluetooth Low Energy communication circuitry and based on a buffer size of the Bluetooth Low Energy communication circuitry.

4. The method of claim 1, wherein sending the outgoing message from the host processor to the Bluetooth Low Energy communication circuitry comprises sending the outgoing message through a host controller interface of the master device.

5. The method of claim 1, wherein the master device is a gateway device.

6. The method of claim 1, wherein the slave device is an access control device.

7. The method of claim 6, wherein the access control device is an electronic lock.

8. A gateway device, comprising:
   a Bluetooth Low Energy communication circuitry;
   a processor; and
   a memory comprising a plurality of instructions stored thereon that, in response to execution by the processor, causes the processor to:
     determine a combined cost of an outgoing message transmission and an expected response message from an access control device, wherein the combined cost is a quantity of tokens;
     determine a number of available tokens associated with data transmission;
     reduce the number of available tokens by the combined cost in response to a determination that the combined cost does not exceed the number of available tokens; and
     send the outgoing message from the processor to the Bluetooth Low Energy communication circuitry in response to the determination that the combined cost does not exceed the number of available tokens.

9. The gateway device of claim 8, wherein the plurality of instructions further causes the processor to periodically increase the number of available tokens up to a token maximum by a predefined number of tokens based on a token refill rate.

10. The gateway device of claim 8, wherein the Bluetooth Low Energy communication circuitry comprises a Bluetooth Low Energy controller.

11. The gateway device of claim 10, wherein the Bluetooth Low Energy communication circuitry comprises a Bluetooth Low Energy radio.

12. The gateway device of claim 11, wherein the Bluetooth Low Energy communication circuitry comprises a system-on-a-chip that includes the Bluetooth Low Energy controller and the Bluetooth Low Energy radio.

13. A system, comprising:
   a plurality of access control devices; and
   a gateway device simultaneously communicatively coupled to the plurality of access control devices over corresponding Bluetooth Low Energy connections, the gateway device configured to (i) determine, by a host processor of the gateway device, a combined cost of an outgoing message transmission of the gateway device and an expected response message from a target access control device of the plurality of access control devices, (ii) determine, by the host processor, a number of available tokens associated with data transmission, (iii) reduce, by the host processor, the number of available tokens by the combined cost in response to a determination that the combined cost does not exceed the number of available tokens, and (iv) send the outgoing message from the host processor to Bluetooth Low Energy communication circuitry of the gateway device in response to the determination that the combined cost does not exceed the number of available tokens.

14. The system of claim 13, wherein the gateway device is further configured to periodically increase the number of available tokens up to a token maximum by a predefined number of tokens based on a token refill rate.

15. The system of claim 14, wherein the token maximum is based on a buffer size of a controller of the Bluetooth Low Energy communication circuitry.

16. The system of claim 13, wherein the token refill rate is based on an average transfer rate of the Bluetooth Low Energy communication circuitry.

17. The system of claim 13, wherein the gateway device is configured to send the outgoing message from the host processor to the Bluetooth Low Energy communication circuitry through a host controller interface of the gateway device.

18. The system of claim 13, wherein the Bluetooth Low Energy communication circuitry comprises a system-on-a-chip that includes a Bluetooth Low Energy controller and a Bluetooth Low Energy radio.

19. The system of claim 13, wherein the gateway device is configured to determine the combined cost based on a cost database.

20. The system of claim 13, wherein at least one access control device of the plurality of access control devices is an electronic lock.

* * * * *